(12) United States Patent
Koch

(10) Patent No.: US 10,920,925 B2
(45) Date of Patent: Feb. 16, 2021

(54) SUCTION CUP MOUNTING COMPRISING A SUCTION FACE AND A HOUSING

(71) Applicant: Tormaxx GmbH, Moenchengladbach (DE)

(72) Inventor: Hubert Koch, Moenchengladbach (DE)

(73) Assignee: Tormaxx GmbH, Moenchengladbach (DE)

( * ) Notice: Subject to any disclaimer, the term of this patent is extended or adjusted under 35 U.S.C. 154(b) by 0 days.

(21) Appl. No.: 16/092,058

(22) PCT Filed: Apr. 7, 2017

(86) PCT No.: PCT/DE2017/000095
§ 371 (c)(1),
(2) Date: Oct. 8, 2018

(87) PCT Pub. No.: WO2017/174056
PCT Pub. Date: Oct. 12, 2017

(65) Prior Publication Data
US 2019/0162363 A1    May 30, 2019

(30) Foreign Application Priority Data

Apr. 8, 2016 (DE) .......................... 10 2016 004 065
Jul. 1, 2016 (DE) .......................... 10 2016 008 003
Aug. 26, 2016 (DE) .......................... 10 2016 010 257

(51) Int. Cl.
*F16M 13/02* (2006.01)
*F16B 47/00* (2006.01)

(52) U.S. Cl.
CPC ........... *F16M 13/022* (2013.01); *F16B 47/00* (2013.01); *F16B 47/006* (2013.01); *F16M 2200/00* (2013.01)

(58) Field of Classification Search
CPC .. F16M 13/022; F16M 2200/00; F16B 47/00; F16B 47/06; A47G 1/17; B25B 11/005;
(Continued)

(56) References Cited

U.S. PATENT DOCUMENTS 2,940,713 A * 6/1960 Van Dusen ............. F16B 47/00
248/205.8
7,603,728 B2 * 10/2009 Roth ...................... A47K 3/003
248/205.7
(Continued)

FOREIGN PATENT DOCUMENTS

DE 20 2014 102 883 U1 9/2014
GB 835 533 A 5/1960
SU 635027 A1 11/1978

OTHER PUBLICATIONS

International Search Report of PCT/DE2017/000095, dated Aug. 30, 2017.

*Primary Examiner* — Christopher Garft
(74) *Attorney, Agent, or Firm* — Collard & Roe, P.C.

(57) ABSTRACT

A suction cup mount has a suction plate and a housing, wherein the suction plate and the housing are connected to each other in such a way that the housing can be pressed onto the suction plate and the suction plate includes a circumferential connection to a mount frame of the housing, which releases itself at a defined release force acting on the housing.

14 Claims, 4 Drawing Sheets

(58) Field of Classification Search
CPC ......... B63B 21/27; B65G 49/061; B66C 1/02; Y10S 292/28; B60R 2011/0056; B60R 2011/0068
USPC ... 248/683, 537, 205.5, 205.7, 205.8, 205.9, 248/206.1, 206.2
See application file for complete search history.

(56) References Cited

U.S. PATENT DOCUMENTS

| | | | |
|---|---|---|---|
| 7,707,765 B2* | 5/2010 | Liao | A01K 97/10 43/21.2 |
| 8,109,479 B1* | 2/2012 | Tsai | F16M 13/022 248/206.3 |
| 8,496,222 B2* | 7/2013 | Li | F16B 47/006 248/683 |
| 8,814,113 B1* | 8/2014 | Chen | F16B 47/00 248/205.5 |
| 2006/0255218 A1* | 11/2006 | Hsiung | B60R 11/02 248/160 |
| 2007/0187965 A1 | 8/2007 | Schaaf et al. | |
| 2008/0093518 A1* | 4/2008 | Roth | A47K 3/38 248/207 |
| 2008/0149790 A1* | 6/2008 | Wang | F16B 47/00 248/205.2 |
| 2010/0146697 A1* | 6/2010 | Roth | A47K 17/022 4/577.1 |
| 2011/0127395 A1 | 6/2011 | Ostendarp | |
| 2013/0127194 A1 | 5/2013 | Regan et al. | |

* cited by examiner

SUCTION CUP MOUNTING COMPRISING A SUCTION FACE AND A HOUSING

CROSS REFERENCE TO RELATED APPLICATIONS

This application is the National Stage of PCT/DE2017/000095 filed on Apr. 7, 2017, which claims priority under 35 U.S.C. § 119 of German Application No. 10 2016 004 065.3 filed on Apr. 8, 2016, German Application No. 10 2016 008 003.5 filed on Jul. 1, 2016, and German Application No. 10 2016 010 257.8 filed on Aug. 26, 2016, the disclosures of which are incorporated by reference. The international application under PCT article 21(2) was not published in English.

BACKGROUND OF THE INVENTION

1. Field of the Invention

The invention relates to a suction cup mount with a suction plate and a housing, wherein the suction plate and the housing are connected to each other in such a way that the housing can be pressed onto the suction plate.

The suction cup has a suction surface or suction plate, which can be positioned on an essentially flat surface and a lever device in order to lift a middle region of this suction plate with relation to the mount frame, which is supported on a circumferential region of the suction plate.

2. Description of the Related Art

Such suction cups are known as retaining hooks for attachment to tiles as a holding device, for example, for attaching electronic devices and camera to a window pane.

In the industrial sector, pneumatic or hydraulic devices are used for lifting the suction plate. In order to attach less heavy devices, for example, to a window pane, the suction plate is lifted against a mount frame with a lever device. In the case of such devices, it is attempted to lift a middle region of the suction plate with the lever as intensely as possible against the suction plate that is pressed onto the flat surface with the mount frame. The more intense the middle region is lifted using the lever, the stronger the suction plate sucks onto the flat smooth surface and the stronger the connection between the suction cup and the surface becomes.

Therefore, it has been attempted, to increase this force by means of improved lever devices.

A problem here is that such suction cup mounts regularly jiggle and swing.

Conventional suction cup mounts have a suction plate and a housing set on top of it, on which tension elements can be attached in various ways, which pull the suction plate away from the surface where the required vacuum is built up in order to press the suction plate against the surface.

The most recent prior art entails the housings laying on the suction plate and exerting pressure on the suction plate. By means of this, the housing also has a certain stability. However, since the suction plate must be made of soft materials in order to achieve a seal on the surface, in the case of stress or vibrations, the housing is capable of lifting away from the suction plate. For the parts attached onto the housing, such as cameras or cell holders, that has the consequence that these intensely jiggle in the event of stress.

Due to this problem, the load that can be mounted to the suction cup mount, is also very limited.

SUMMARY OF THE INVENTION

The object of the invention is to develop suction cup mounts according to the class.

This task is achieved by means of a suction cup mount with the features according to the invention.

Favorable further embodiments are discussed below.

In the case of a favorable embodiment, the suction plate is designed in such a way that the suction plate is connected to the housing. The edge of the suction plate is larger than the housing. The edge of the suction plate is provided in such a way that it encloses the lower edge of the housing. The housing has a circumferential edge; the suction plate has a circumferential groove in which the edge of the housing is located.

If the two components would be rigidly connected to each other, lateral stresses would lead to the lifting of the suction plate, which, in turn, would result in a ripping of the vacuum seal, after which the suction cup would fall off.

For this reason, the embodiment of the invention has a flexible connection, the retaining force of which is designed in such a way that the suction plate and the housing are firmly connected in such a way so that the loads to be fastened can be mounted without any problems. Thereby, the stresses occurring during normal operation, such as vibrations or also forces occurring due to acceleration, are absorbed. Only when the stresses due to non-operationally-related forces, such as an accident or a fall for example, are so high that the lateral forces would lift the suction plate does the housing lift out of the groove of the suction plate. The suction plate is secured with a circumferential rubber ring, which, in the event the defined force has been exceeded, releases the housing in such a way that it goes out of the groove of the suction plate, thereby releasing the connection. In this case, the suction cup mount works like conventional mounts also, which apply force onto the tension part, which is seated in the middle of the suction plate.

The strength of a suction cup can be amplified by enlarging the suction plate.

This also requires a greater force and usually also a longer path on the clamping lever. As an alternative, a plurality of suction cups can also be provided, which each have their own clamping lever, thereby increasing the retaining force. However, this results in greater dimensions of the suction cup mount. The invention is based on the knowledge that the suction plate can be lifted on a plurality of points that are spaced away from each other on the suction plate of a suction cup. The lever device can be designed so that it lifts the suction plate against a circumferential region of the suction plate at a plurality of points. By means of this, a higher contact pressure with a limited path can be achieved.

It is favorable that the middle region comprises a plurality of holding stamps.

Particularly good results were obtained with a suction plate that has a shape deviating from a circular one, such as an oval shape for example. However, also shapes, such as those having a plurality of circular surfaces for example, such as is the case with a flower pedal or also shaped surfaces can be used, which are provided for a certain use.

A first variant provides that a lever of the lever device can lift the suction plate at a plurality of points in the middle region of the suction plate. Thereby, an individual lever acts on a plurality points spaced away from each other of the suction plate.

Favorably, it is provided that the lever device comprises a plurality of levers in order to lift the suction plate and a plurality of points in the middle region of the suction plate.

A compact construction is achieved if the lever device comprises levers that can swivel in the opposing direction around axes arranged in parallel.

In order to release a lever of the lever device easier, it is suggested that at least one lever of the lever device comprises a flexible release tab, which is arranged under the lever an extension of the lever in order to facilitate the release of the lever in a tangible manner.

In order to fasten a camera or a mobile telephone for example on the suction cup, it is suggested that a detachable mount is arranged on the mount frame. This mount can, for example, be arranged between two levers that can be swiveled in an opposing direction around axes arranged in parallel.

In order to release an active suction plate on a smooth surface from the surface more easily after releasing the levers, it is suggested that the suction plate comprises a release tab, which radially protrudes further from the mount frame than the remaining areas of the suction surface.

It is favorable if a pressure sensor is arranged between the points of the lever device, at which they can lift the suction plate in the middle region of the suction plate. In a simple manner, the pressure sensor can measure a parameter, which correlates with the pressure at this point, in more precise or terms, the negative pressure. For example, these can be a local stress in the suction plate or a distance between the suction plate and the flat surface.

This pressure sensor can transmit the measured value to an indicator or a signalling device in various ways. A simple embodiment provides that the pressure sensor comprises a mechanical pressure indicator. Thereby, a mechanical deep formation can act on an indicator device and a mechanical level. For example, this can be a rod with markings, which is moved within a sleeve so that the pressure can be read at the relative position between the rod and the sleeve. However, a material can also be used at a point of the suction plate that is differently colored depending on the stress in order to indicate if a certain negative pressure has been exceeded.

It is favorable if the pressure sensor comprises an electronic pressure indicator. For this purpose, known devices can be used that measure a parameter, which correlates with the pressure at this point, in more precise terms, the negative pressure.

In particular, in the case that the pressure sensor comprises an electronic pressure indicator, it is suggested that the pressure sensor comprise a transmitting device. This can be a simple Bluetooth interface, which, for example, transmits the information to a mobile telephone so that the mobile telephone can assume the indicator and/or signalling function.

BRIEF DESCRIPTION OF THE DRAWINGS

A particularly favorable design variant is shown in the drawing and will be explained in the following in more detail.

The figures show

DETAILED DESCRIPTION OF THE PREFERRED EMBODIMENTS

Figure 1:
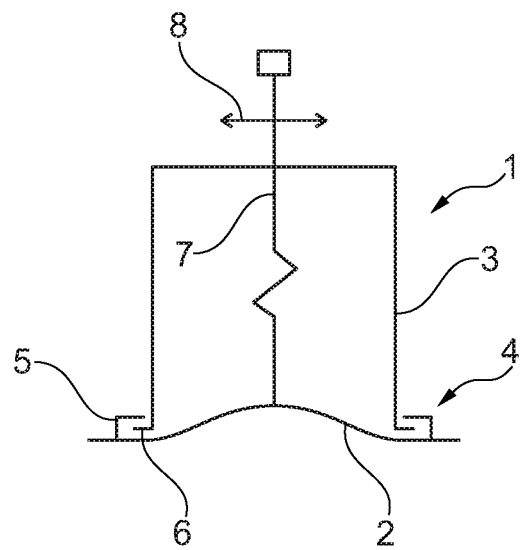
FIG. 1 schematically, a section through a suction cup mount that is not according to the invention, FIG. 2 a suction cup mount in accordance with FIG. 1 in the case of force acting on the housing, which is lower than the defined release force.

FIG. 1 shows a suction cup mount 1 with a suction plate 2 and housing 3. The suction plate 2 and housing 3 are connected to each other in such a way that the housing 3 can be pressed onto the suction plate 2. The tension element 7 is provided for this. The suction plate 2 has a circumferential connection 4 to the housing 3, which releases itself at a defined release force acting on the housing 3.

This circumferential connection 4 is designed as a flexible connection. In the exemplary embodiment, it is designed in a ring-shaped manner as a tongue-and-groove connection, wherein the groove 5 is arranged on the suction plate 2 and the tongue 6 is arranged on the housing 3.

The suction plate 2 and the housing 3 are circular and the diameter of the suction plate 2 is greater than the diameter of the housing 3.

Figure 2:
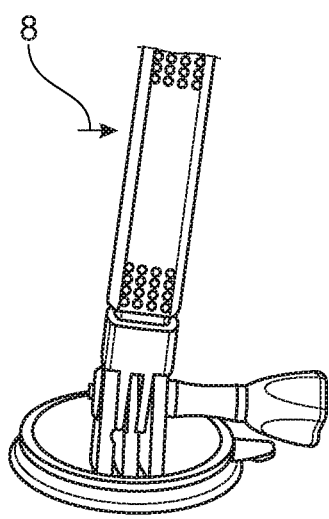
Figure 3:
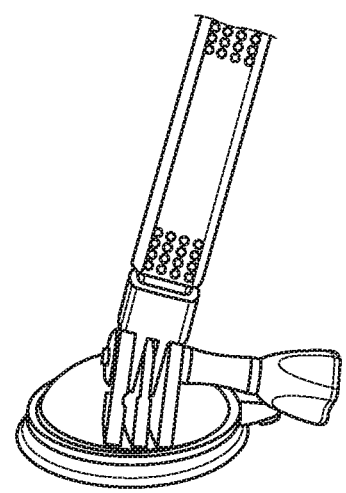
FIG. 3 a suction cup mount in accordance with FIG. 1 in the case of force acting on the housing, which is higher than the defined release force.

FIG. 2 shows how the suction plate 2 and the housing 3 remain firmly connected up to a maximum force 8 and FIG. 3 shows how the housing releases from the groove when a maximum force has been exceeded. Afterwards, the mount behaves like a conventional mount without a groove.

Figure 4:
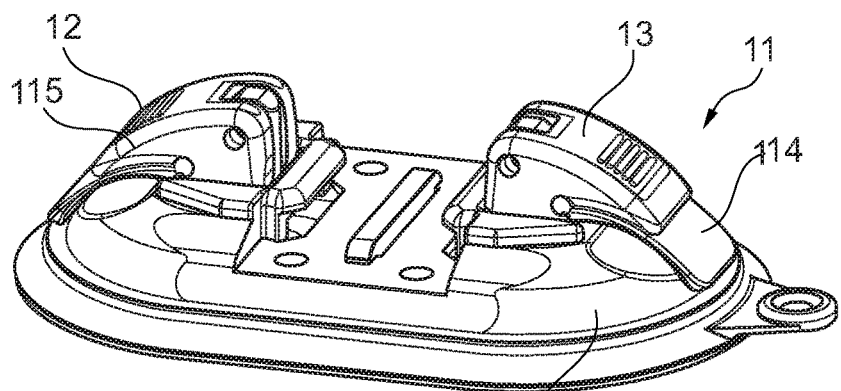
FIG. 4 a suction cup mount with two closed levers.
Figure 5:
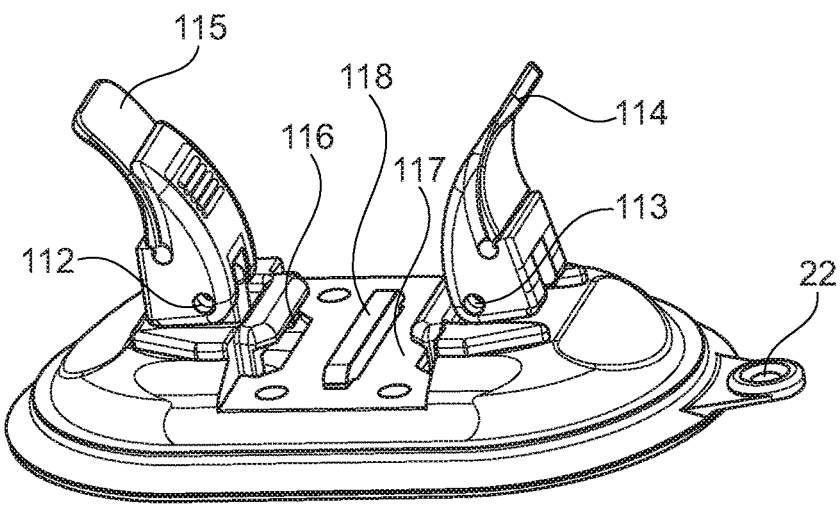
FIG. 5 the suction cup mount shown in FIG. 4 with open levers.
Figure 6:
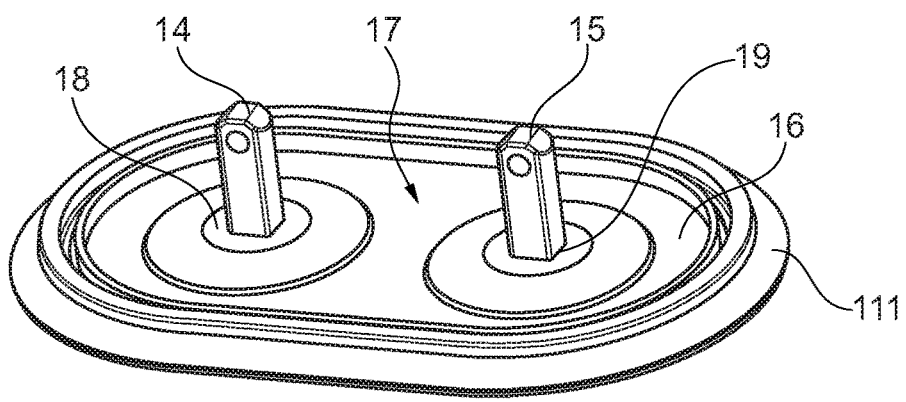
FIG. 6 the suction plate of the suction cup mount shown in FIG. 4.

FIG. 4 shows a suction cup 11 with two levers 12, 13 that are arranged spaced away from each other, which act on the suction plate 16 via the holding stamp 14, 15. By means of the levers 12, 13, the stamps 14, 15 can be lifted in order to lift the suction plate 16 in a middle region 17 at two points 18, 19 while a mount frame 110 presses the suction plate 16 in the outer area 111 downwardly onto a surface (not shown).

The suction plate is oblong with rounded opposite areas and the levers 12, 13 can be swiveled around the axes 112 and 113 above the suction plate spaced away from one another in order to lift the stamps 14 and 15 when retracting the levers 12, 13 by swiveling the levers around the axes 112 and 113 in an opposing direction. Thereby, the levers are swiveled around a dead point in order to assume a stable position in a retracted position. Thereby, in order to release the retracted levers 12, 13, tabs 114, 115 a are provided which protrude over the levers 12, 13 as flexible rubber tabs in order to be able to lift the levers more easily by pulling on the tab 114, 115.

Figure 7:
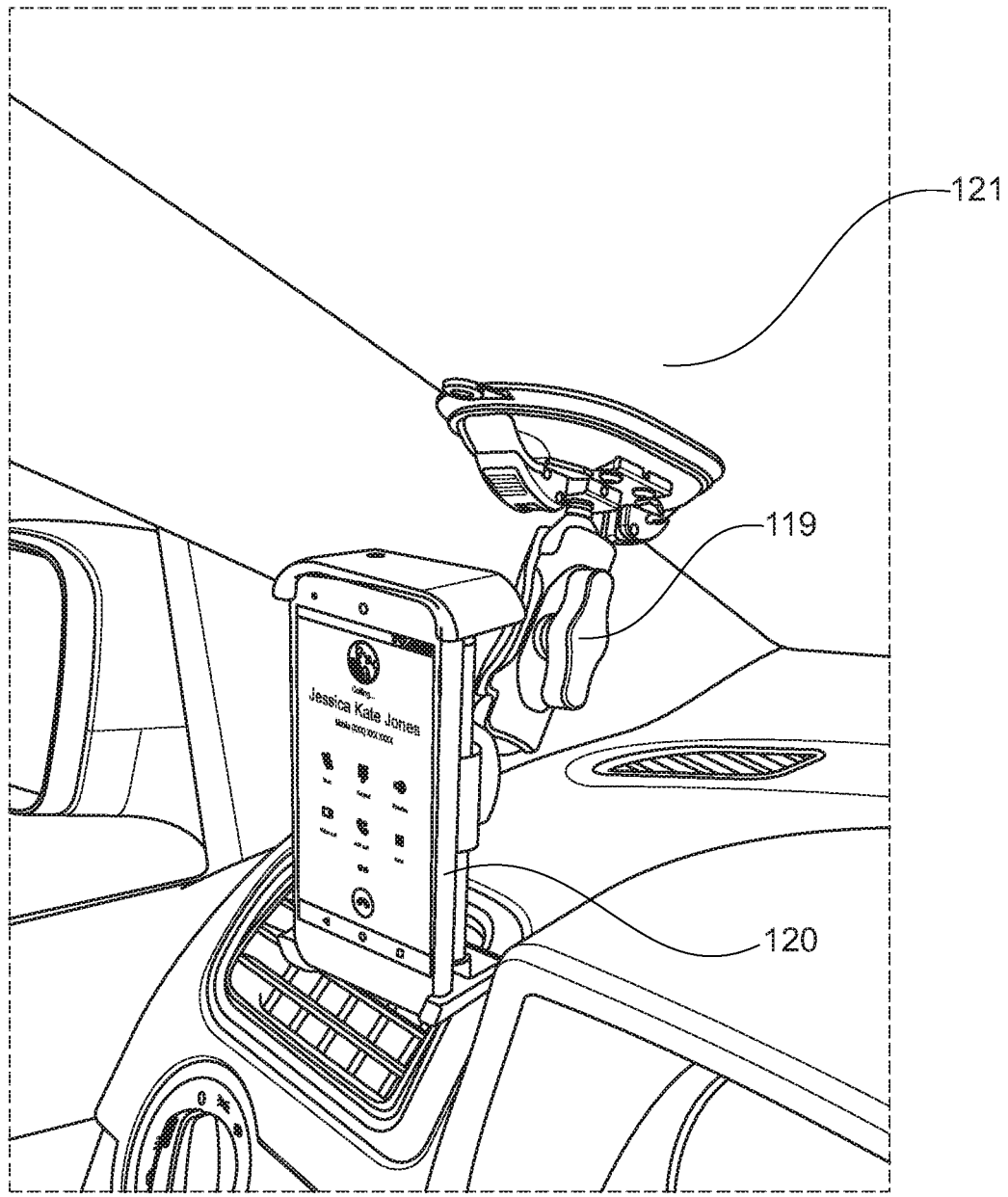
FIG. 7 the suction cup mount with a supporting arm on a window pane

FIG. 7 shows how a swiveling mount 119 in a retaining area between the levers can be fastened to two grooves 116, 117 and a bar 118 located in between, onto which a mobile telephone 120 is fastened in the exemplary embodiment.

In order to release the suction plate 16 of the window pane 121 again, a release tab 22 is provided, which protrudes radially over the mount frame 110.

Figure 8:
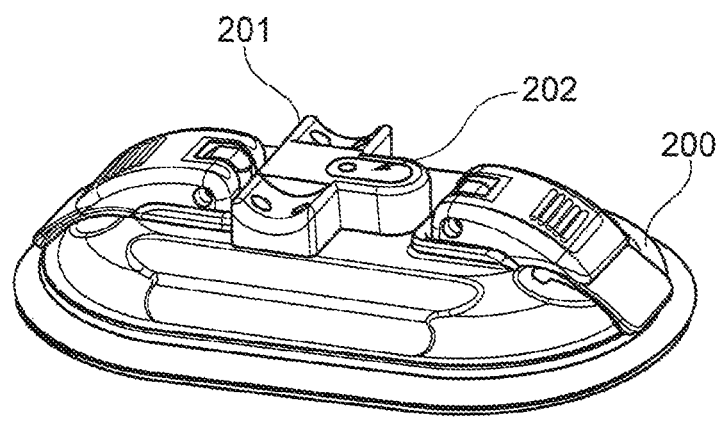
FIG. 8 a suction cup mount with a flat indicator.

FIG. 8 shows a housing 200 with an attachment part 201. In the middle region of the housing 200, a pressure indicator 202 is provided as part of a pressure sensor 206. This pressure indicator is integrated into the housing of 200 in a flush manner so that, in a normal case with sufficient contact pressure, it does not protrude over the housing surface.

Figure 9:
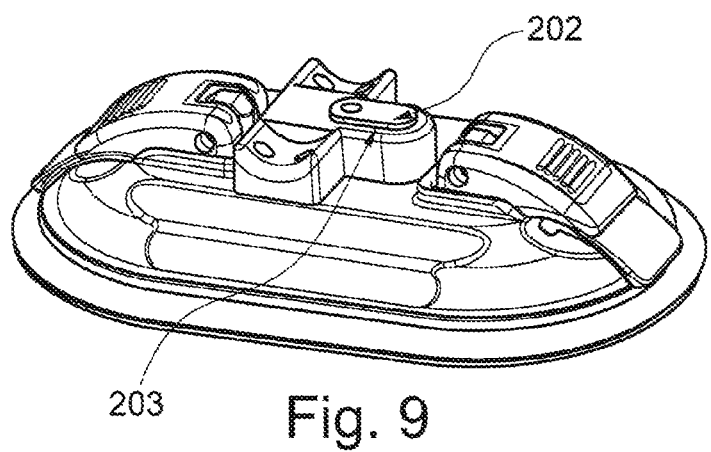
FIG. 9 the suction cup mount shown in FIG. 8 with a slightly protruding indicator and FIG. 10 the suction cup mount shown in FIG. 8 with a considerably protruding indicator.

FIG. 9 shows how the suction plate is lifted in the middle region as the contact pressure is relieved and the pressure indicator 202 attached to it starts to indicate a higher reading. By means of this, the upper side of the pressure indicator slightly protrudes over the housing. By means of this a side marking 203 is visible that indicates that the suction pressure has already declined. The vacuum between the contact surface, such as the window pane 121 and the suction plate, has thereby declined.

Figure 10:
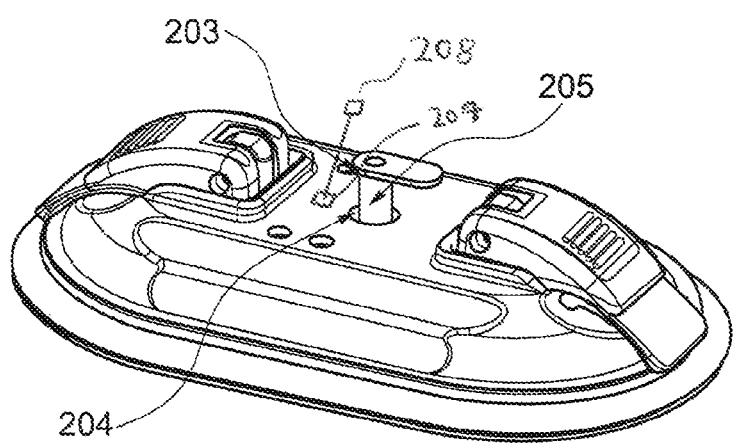

FIG. 10 shows the housing breakthrough 204, in which a rod 205 designed as an indicator rod with a red marking 203 can be moved up and down depending on the position of the underlying suction plate in order to show the actual suction force. In the exemplary embodiment shown in FIG. 10, the attachment part 201 is removed. Under it, there is an electronic pressure indicator 207, which is connected to a transmitting device 208.

The invention claimed is:

1. A suction cup mount comprising:
   a single oval-shaped suction plate comprising a middle region and a circumferential region,
   a housing comprising a mount frame, the housing being connected to the single oval-shaped suction plate in such a way that the housing can be pressed onto the single oval-shaped suction plate, the mount frame being supported on the circumferential region of the single oval-shaped suction plate via a circumferential connection,
   a first lever device configured to lift the middle region of the single oval-shaped suction plate against the mount frame, the first lever device comprising a first lever and a first holding stamp connected to the first lever, the first holding stamp being connected to the middle region at a first point, the first lever acting on the single oval-shaped suction plate via the first holding stamp,
   a second lever device configured to lift the middle region of the single oval-shaped suction plate against the mount frame, the second lever device comprising a second lever and a second holding stamp connected to the second lever, the second holding stamp being connected to the middle region at a second point, the second lever acting on the single oval-shaped suction plate via the second holding stamp,
   wherein the first and the second points are spaced apart from each other,
   wherein the first holding stamp is distinct from the second holding stamp, and the first holding stamp and the second holding stamp are spaced apart from each other,
   wherein the first lever is operable to exert a force on the single oval-shaped suction plate at the first point via the first holding stamp separately and independently of the second lever and the second holding stamp,
   wherein the second lever is operable to exert a force on the single oval-shaped suction plate at the second point via the second holding stamp separately and independently of the first lever and the first holding stamp and
   wherein the first and the second levers are able to be swiveled in opposing directions around first and second axes, respectively, arranged in parallel in order to separately and independently lift the single oval-shaped suction plate at the first and the second points in the middle region of the single oval-shaped suction plate.

2. The suction cup mount according to claim 1, wherein the circumferential connection is designed as a flexible connection.

3. The suction cup mount according to claim 1, wherein the circumferential connection is designed as a predetermined breaking point.

4. The suction cup mount according to claim 1, wherein the circumferential connection is designed as a tongue-and-groove connection.

5. The suction cup mount according to claim 4, wherein the groove is arranged on the single oval-shaped suction plate and the tongue is arranged on the housing.

6. The suction cup mount according to claim 1, wherein the circumferential connection is ring-shaped.

7. The suction cup mount according to claim 1, wherein the first lever comprises a flexible release tab, and
   wherein the flexible release tab is arranged under the first lever as an extension of the first lever in order to facilitate a release of the first lever in a tangible manner.

8. The suction cup mount according to claim 1, further comprising a mount arranged on the mount frame in a detachable manner.

9. The suction cup mount according to claim 8, wherein the mount is arranged between the first and the second levers.

10. The suction cup mount according to claim 1, wherein the single oval-shaped suction plate comprises a release tab, and
    wherein the release tab radially protrudes from the mount frame further than remaining areas of the single oval-shaped suction plate.

11. The suction cup mount according to claim 1, further comprising a pressure sensor arranged between the first and the second points.

12. The suction cup mount according to claim 11, wherein the pressure sensor comprises a mechanical pressure indicator.

13. The suction cup mount according to claim 11, wherein the pressure sensor comprises a pressure indicator.

14. The suction cup mount according to claim 11, wherein the pressure sensor comprises a transmitting device.

* * * * *